(12) United States Patent
Schäfer et al.

(10) Patent No.: US 11,973,616 B2
(45) Date of Patent: Apr. 30, 2024

(54) ETHERCAT BUS SYSTEM INCLUDING AN ETHERCAT BUS MASTER AND ETHERCAT BUS STATION

(71) Applicant: SEW-EURODRIVE GMBH & CO. KG, Bruchsal (DE)

(72) Inventors: Michael Schäfer, Karlsdorf-Neuthard (DE); Daniel Brunner, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 207 days.

(21) Appl. No.: 17/641,377

(22) PCT Filed: Aug. 6, 2020

(86) PCT No.: PCT/EP2020/025361
§ 371 (c)(1),
(2) Date: Mar. 8, 2022

(87) PCT Pub. No.: WO2021/043435
PCT Pub. Date: Mar. 11, 2021

(65) Prior Publication Data
US 2022/0407739 A1  Dec. 22, 2022

(30) Foreign Application Priority Data

Sep. 6, 2019  (DE) .......................... 102019006303.1

(51) Int. Cl.
*H04L 12/40* (2006.01)
*H04L 12/44* (2006.01)

(52) U.S. Cl.
CPC ........ *H04L 12/40019* (2013.01); *H04L 12/44* (2013.01); *H04L 2012/4026* (2013.01)

(58) Field of Classification Search
None
See application file for complete search history.

(56) References Cited

U.S. PATENT DOCUMENTS

2014/0047056 A1  2/2014  Tahara et al.
2017/0071076 A1*  3/2017  Yu ..................... H05K 7/20545

FOREIGN PATENT DOCUMENTS

| EP | 2688002 A1 | 1/2014 |
| EP | 2688250 A1 | 1/2014 |
| WO | 2012087901 A2 | 6/2012 |

OTHER PUBLICATIONS

'Fault Tolerance in Highly Reliable Ethernet-Based Industrial Systems' by Alvarez et al., Date of publication May 24, 2019; date of current version May 28, 2019. (Year: 2019).*
Trinamic 'TMC8462 Datasheet Document Revision V1.5' Jun. 21, 2019 (Year: 2019).*
'SoC vs. CPU—The battle for the future of computing' by Sebastian Anthony, Apr. 19, 2012. (Year: 2012).*
'Is a single-chip SOC processor right for your embedded project?' by Embedded, Aug. 12, 2013. (Year: 2013).*
(Continued)

*Primary Examiner* — Steven G Snyder
(74) *Attorney, Agent, or Firm* — Carter, DeLuca & Farrell LLP

(57) ABSTRACT

An EtherCAT bus system includes an EtherCAT master, EtherCAT nodes, and an EtherCAT star hub arranged and/or assembled on the same printed circuit board with the EtherCAT master.

16 Claims, 1 Drawing Sheet

(56) References Cited

OTHER PUBLICATIONS

'Plan Ahead For A Successful SoC-Based PCB Design' by Damon Domke, Sep. 5, 2013. (Year: 2013).*
'Design Guide COMX Communication Modules' by Hilscher, 2013. (Year: 2013).*
'EtherCAT and EtherCAT P Slave Implementation Guide' Document: ETG.2200 V3.1.0, EtherCAT Technology Group, 2018. (Year: 2018).*
'DREAMS—Distributed Real-time Architecture for Mixed Criticality Systems—Cross Domain Mixed-Criticality Pattern D 5.3.1' 2016. (Year: 2016).*
'Topology Aspects in EtherCAT Networks' by Mladen Knezic, 14th International Power Electronics and Motion Control Conference, EPE-PEMC 2010. (Year: 2010).*
'EtherCAT—The Ethernet Fieldbus' by EtherCAT Technology Group, 2009. (Year: 2009).*
Machine Translation of WIPO Publication WO 2022185656 A1, 2021. (Year: 2021).*
Machine Translation of WIPO Publication WO 2022185657 A1, 2021. (Year: 2021).*
Machine Translation of Chinese Patent Application CN 114162067 A, 2022. (Year: 2022).*
Machine Translation of Chinese Patent Application CN 107707447 A, 2018. (Year: 2018).*
Machine Translation of European Patent Application EP 2986093 A1, 2016. (Year: 2016).*
Machine Translation of Chinese Patent Application CN 203070010 U, 2013. (Year: 2013).*
Machine Translation of Chinese Patent Application CN 111148348 A, 2020. (Year: 2020).*
Machine Translation of Chinese Patent Application CN 205017332 U, 2016. (Year: 2016).*
Machine Translation of Chinese Patent Application CN 105119658 A, 2015. (Year: 2015).*
Machine Translation of Chinese Patent Application CN 212677169 U, filed Jul. 13, 2020. (Year: 2020).*
Machine Translation of Chinese Patent Application CN 110768880 A, filed Oct. 30, 2019. (Year: 2019).*
Machine Translation of Korean Patent Application KR 101179431 B1, filed Jun. 17, 2011. (Year: 2011).*
International Report on Patentability issued in corresponding International Application No. PCT/EP2020/025361 dated Mar. 8, 2022, pp. 1-8, English Translation.
International Search Report issued in corresponding International Application No. PCT/EP2020/025361 dated Nov. 17, 2020, pp. 1-2, English Translation.

* cited by examiner

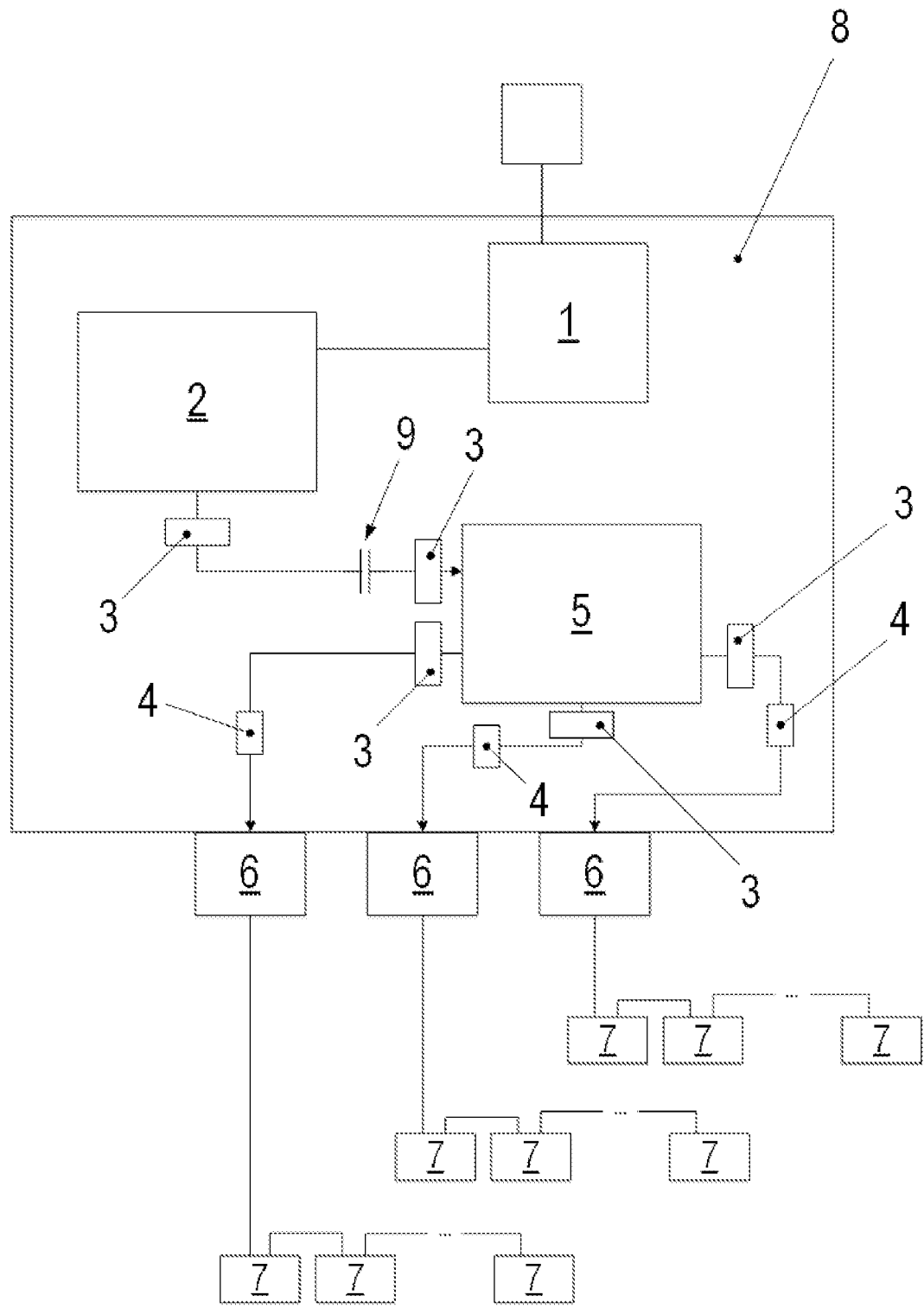

ETHERCAT BUS SYSTEM INCLUDING AN ETHERCAT BUS MASTER AND ETHERCAT BUS STATION

FIELD OF THE INVENTION

The present invention relates to an EtherCAT bus system that includes an EtherCAT master and EtherCAT nodes.

BACKGROUND INFORMATION

A method for operating an EtherCAT fieldbus system is described in German Patent Document No. 10 2017 214 893, which includes a computer as a master.

A bus system is described in U.S. Patent Application Publication No. US 2014/0047056, in which an appropriate master for each hub must be stocked in the warehouse during production processes, to be subsequently selected and assembled.

SUMMARY

Example embodiments of the present invention provide for sections to be connected in a star topology using EtherCAT in a flexible manner.

According to an example embodiment of the present invention, an EtherCAT bus system includes an EtherCAT master, EtherCAT nodes, and an EtherCAT star hub arranged and/or assembled on the same printed circuit board with the EtherCAT master.

The advantage of this configuration is that the star topology can be executed directly on the printed circuit board and therefore also in real time. In addition, the arrangement is interference-proof. In addition, the voltage can be refreshed. Due to the integrated arrangement on a single printed circuit board, a real-time-capable realization of the EtherCAT bus is made possible.

The flexibility is ensured by the arrangement on a single printed circuit board, as the assembly of the circuit board can be executed in a flexible manner. Depending on requirements, a different assembly may be performed. Thus, a desired variation of star hub and master can be assembled. Therefore, no increased storage capacity is required.

According to example embodiments, a level converter is arranged at the connection, e.g., at the output, of the master, from which data lines lead to another level converter via at least one capacitive isolation, e.g., a capacitor arrangement, which other level converter is arranged and/or connected to the connection of the star hub. The advantage of this arrangement is that, despite the arrangement on the same printed circuit board resulting in a short distance between the master and the star hub, a level conversion and level reconversion connected by galvanic isolation is achieved.

According to example embodiments, the star hub has outputs, respective further level converters being arranged at and/or connected to each output, which further level converters each are connected via a galvanic isolation to respective connector parts assembled on the printed circuit board. A string of nodes connected in series by the EtherCAT data bus are able to be connected, e.g., are connected, to the respective connector parts. The advantage of this arrangement is that level converters again are provided such that the star hub itself can be executed in TTL logic. In this manner, it is made possible in a simple manner to refresh the voltage in the star hub.

According to example embodiments, the printed circuit board is surrounded by a housing, and a heat sink dissipates the heat loss of the master and the star hub to the environment. The advantage of this arrangement is that a shared housing for the printed circuit board with master and star hub is required.

According to example embodiments, the master is connected to an Ethernet interface, which is also arranged on the printed circuit board. The advantage of this arrangement is that information transmitted via EtherCAT can be further transmitted via Ethernet.

According to example embodiments, the Ethernet interface is arranged at a distance to the master which is shorter than the distance from the star hub to the master, or the Ethernet interface is arranged at a distance to the star hub which is shorter than the distance from the master to the star hub. The advantage of this arrangement is that no interference is caused, even though the Ethernet interface can be arranged very close, which means that interference radiation is emitted. However, since level conversion, galvanic isolation, differential data lines, and voltage refreshing are provided, the interference influence can be kept under control.

According to example embodiments, the master is arranged as a single component, e.g., as an IC, i.e., an integrated circuit, and is, for example, assembled on the printed circuit board. The advantage of this arrangement is that an integrated configuration is achievable and thus high data streams can be transferred error-free or at least with few errors.

According to example embodiments, the star hub is arranged as a single component, e.g., as an IC, i.e., an integrated circuit, and is, for example, assembled on the printed circuit board. The advantage of this arrangement is that a compact configuration is made possible, whereby mass production is made possible, thus requiring low costs per component.

According to example embodiments, the master is connected to an Ethernet interface, which is also arranged and/or assembled on the printed circuit board. The advantage of this configuration is that a simple production process can be carried out in a compact manner.

Further features and aspects of example embodiments of the present invention are explained in more detail below with reference to the appended schematic FIGURE.

BRIEF DESCRIPTION OF THE DRAWING

FIG. 1 schematically illustrates a system according to an example embodiment of the present invention.

DETAILED DESCRIPTION

According to an example embodiment of the present invention, a controller 1 is assembled on a, e.g., single-piece, i.e., arranged in one part, printed circuit board 8, which controller 1 has an Ethernet interface and is also connected for transmitting data to a master 2 assembled on the printed circuit board 8.

The master 2 has a connection for transmitting data which is connected via a level converter 3 and a differential data line as well as a capacitive decoupling 9 to another level converter, which is arranged at a connection of a star hub 5.

Thus, after the conversion of the voltage levels by the level converter 3, the signals of the master are routed via the differential data lines to a capacitor arrangement, which provides galvanic isolation. DC voltages therefore cannot be conducted from the level converter 3 connected to the connection of the master 2 to the level converter 3 connected to the connection of the star hub 5.

The voltage level of the AC voltage portions, which are passed through the capacitor arrangement, is converted by the level converter 3 and fed to the star hub 5, e.g., as a TTL level. The master can also be controlled by a TTL level, such that only the differential data line has a different level.

The master is an EtherCAT master, and the star hub is also an EtherCAT star hub. For example, the signals coming from the master 2 are fed to the other connections of the star hub 5, whose signals are fed to respective level converters 3 and in turn are routed as differential signals to connectors 6 assembled on the printed circuit board 8, in each case via a galvanic decoupling 4.

Multiple nodes 7 arranged as EtherCAT nodes form respective, serially connected strands, each of which is connected to the corresponding connector 6.

Multiple strands can therefore be connected to the star hub 5. Three strands are connected in the example shown in FIG. 1.

As the star hub 5 and the master 2 are assembled on the same printed circuit board, only a single housing is required for the star hub 5 and the master 2. In addition, heat dissipation can be achieved by a single heat sink, which dissipates heat loss from the star hub 5 and heat loss from the master 2 to the environment.

As the data lines coming into and going out from the star hub 5 are galvanically decoupled, a voltage refresh can be carried out within the star hub 5 in further example embodiments.

Although master 2 and star hub 5 are arranged on the same printed circuit board 8, level converters 3 and galvanic isolations, e.g., capacitive isolations, are provided. Thus, other signal electronics components can be arranged on the printed circuit board, the electromagnetic radiation of which would typically be interfering; however, since the galvanic isolations and level conversions reduce the negative effects of interference radiation, these other signal electronics components can be arranged very close to the EtherCAT components, e.g., master 2 and star hub 5.

Such an additional signal electronics component is, for example, the Ethernet interface. Thus, this interface can also be arranged very close to the master 2 or the star hub 5. For example, the Ethernet interface is arranged at a distance to the master that is shorter than the distance of the star hub 5 from the master, or the Ethernet interface is arranged at a distance to the star hub that is shorter than the distance of the master to the star hub.

For example, the master 2 is arranged as an EtherCAT master 2, and the nodes 7 are arranged as EtherCAT nodes 7. Furthermore, the star hub 5 is arranged as an EtherCAT hub.

LIST OF REFERENCE NUMERALS

1 Controller
2 Master
3 Level converters
4 Galvanic decoupling
5 Star hub
6 Connection, e.g., connectors
7 Nodes
8 Printed circuit board
9 Capacitive isolation

The invention claimed is:

1. An Ethernet for Control Automation Technology (EtherCAT) bus system, comprising:

an EtherCAT master provided on a printed circuit board and including a first connection;
EtherCAT nodes; and
an EtherCAT star hub arranged and/or assembled on the printed circuit board with the EtherCAT master and including a second connection;
wherein a level converter is arranged at a connection of the master, from which data lines lead to another level converter via at least one capacitive isolation, the other level converter being arranged at and/or connected to a connection of the star hub.

2. The EtherCAT bus system according to claim 1, wherein the first connection corresponds to an output of the master.

3. The EtherCAT bus system according to claim 1, wherein the capacitive isolation includes a capacitor.

4. The EtherCAT bus system according to claim 1, wherein the star hub includes outputs, respective further level converters being arranged at and/or connected to each output, the further level converters being connected via a galvanic isolation to respective connector parts assembled on the printed circuit board, a string of nodes connected in series by the EtherCAT data bus being connectable and/or connected to the respective connector parts.

5. The EtherCAT bus system according to claim 1, wherein the printed circuit board is surrounded by a housing, and a heat sink is adapted to dissipate a heat loss of the master and the star hub to the environment.

6. The EtherCAT bus system according to claim 1, wherein the master is connected to an Ethernet interface arranged on the printed circuit board.

7. The EtherCAT bus system according to claim 6, wherein the Ethernet interface is arranged at a distance to the master that is shorter than a distance from the star hub to the master.

8. The EtherCAT bus system according to claim 6, wherein the Ethernet interface is arranged at a distance to the star hub that is shorter than a distance from the master to the star hub.

9. The EtherCAT bus system according to claim 1, wherein the master is arranged as a single component.

10. The EtherCAT bus system according to claim 1, wherein the master is arranged as an integrated circuit.

11. The EtherCAT bus system according to claim 1, wherein the master is arranged as a single component assembled on the printed circuit board.

12. The EtherCAT bus system according to claim 1, wherein the star hub is arranged as a single component.

13. The EtherCAT bus system according to claim 1, wherein the star hub is arranged as an integrated circuit.

14. The EtherCAT bus system according to claim 1, wherein the star hub is arranged as a single component assembled on the printed circuit board.

15. The EtherCAT bus system according to claim 1, wherein the printed circuit board is surrounded by a single housing, and a single heat sink is adapted to dissipate a heat loss of the master and the star hub to the environment.

16. An Ethernet for Control Automation Technology (EtherCAT) bus system, comprising:

an EtherCAT master provided on a printed circuit board and including a first connection;
EtherCAT nodes; and
an EtherCAT star hub arranged and/or assembled on the printed circuit board with the EtherCAT master and including a second connection;
wherein a first level converter is connected to the first connection of the EtherCAT master, a second level converter is connected to the second connection with the EtherCAT star hub, and data lines of the first level converter and the second level converter are connected to each other via at least one capacitive isolation.

\* \* \* \* \*